United States Patent [19]

Puck et al.

[11] 4,362,521

[45] Dec. 7, 1982

[54] POWER TRANSMISSION SHAFT

[75] Inventors: Alfred Puck, Kassel, Fed. Rep. of Germany; Peter Voirol, Binningen, Switzerland

[73] Assignee: Ciba-Geigy Corporation, Ardsley, N.Y.

[21] Appl. No.: 145,077

[22] Filed: Apr. 30, 1980

[30] Foreign Application Priority Data

May 10, 1979 [CH] Switzerland .................. 4373/79

[51] Int. Cl.³ .................................... F16D 3/26
[52] U.S. Cl. .............................. 464/181; 464/183; 464/179; 464/182
[58] Field of Search ............... 64/1 S, 1 R, 2 R; 138/109, 123, 124, 130, 140, 144; 464/179, 181, 182, 183

[56] References Cited

U.S. PATENT DOCUMENTS

| | | | |
|---|---|---|---|
| 1,755,387 | 4/1930 | Christophersen | 64/1 S |
| 2,332,940 | 10/1943 | Senke | 64/2 R |
| 4,173,128 | 11/1979 | Corvelli | 64/1 S |
| 4,248,062 | 2/1981 | McLain et al. | 64/1 S |
| 4,259,382 | 3/1981 | Schwan | 464/181 |

FOREIGN PATENT DOCUMENTS

| | | | |
|---|---|---|---|
| 186043 | 11/1963 | Sweden | 64/1 S |
| 698902 | 10/1953 | United Kingdom | 64/1 S |

*Primary Examiner*—P. S. Lall
*Attorney, Agent, or Firm*—Harry Falber

[57] ABSTRACT

The carbon fibre reinforced plastics tube (1) is provided at each end with a cemented-in sleeve (2) and a cemented-on sleeve (3) made of the same material and having the same anisotropy behaviour. A fitting (4) is inserted into each end of the tube to introduce a torque and is secured by bolts (5). The bolts are secured by a sleeve (6). The securing of the fittings by bolts and the adapted structure of the wall reinforcements ensure a safe introduction of torque, even into extremely anisotropic tubes.

15 Claims, 7 Drawing Figures

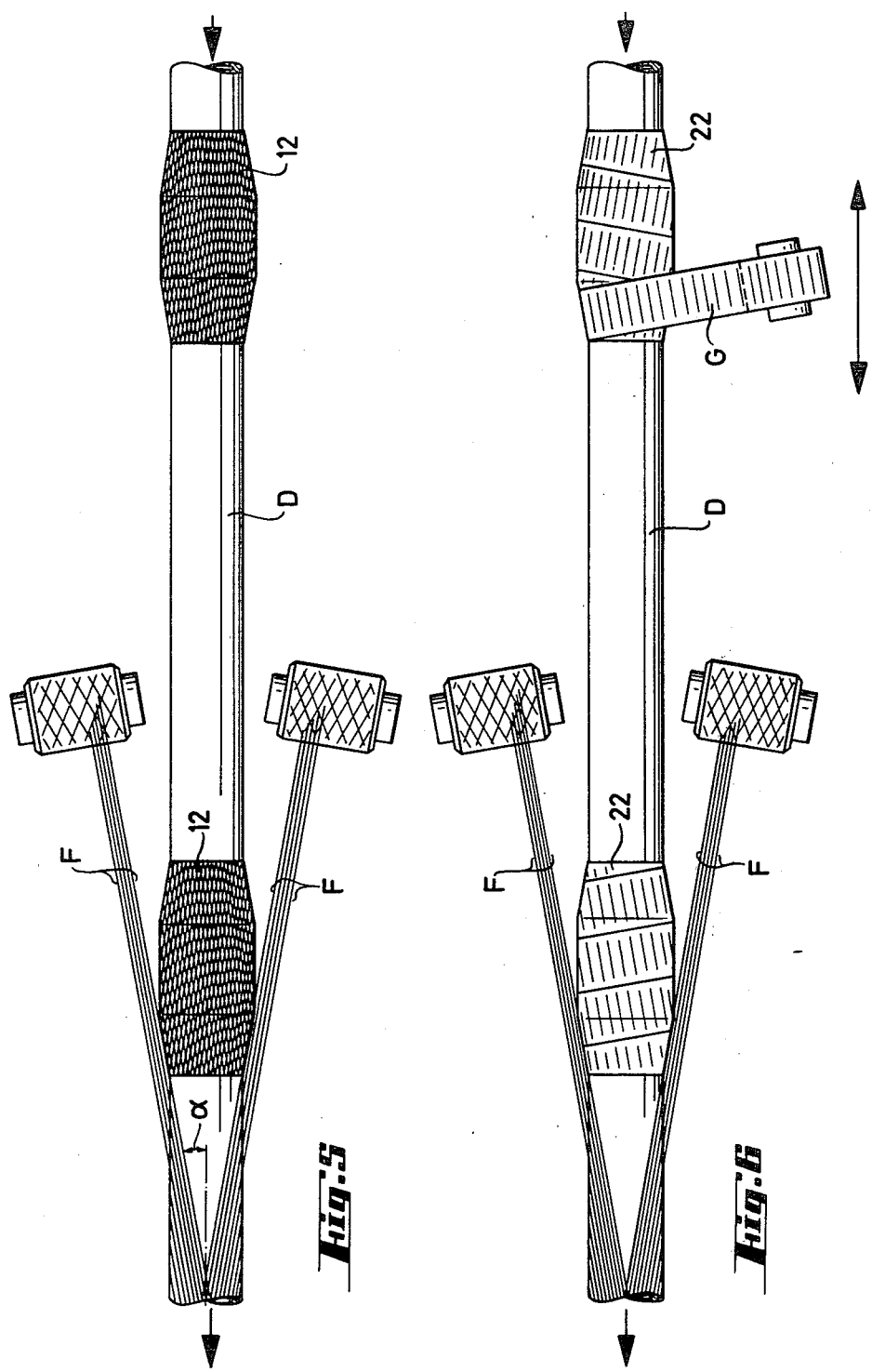

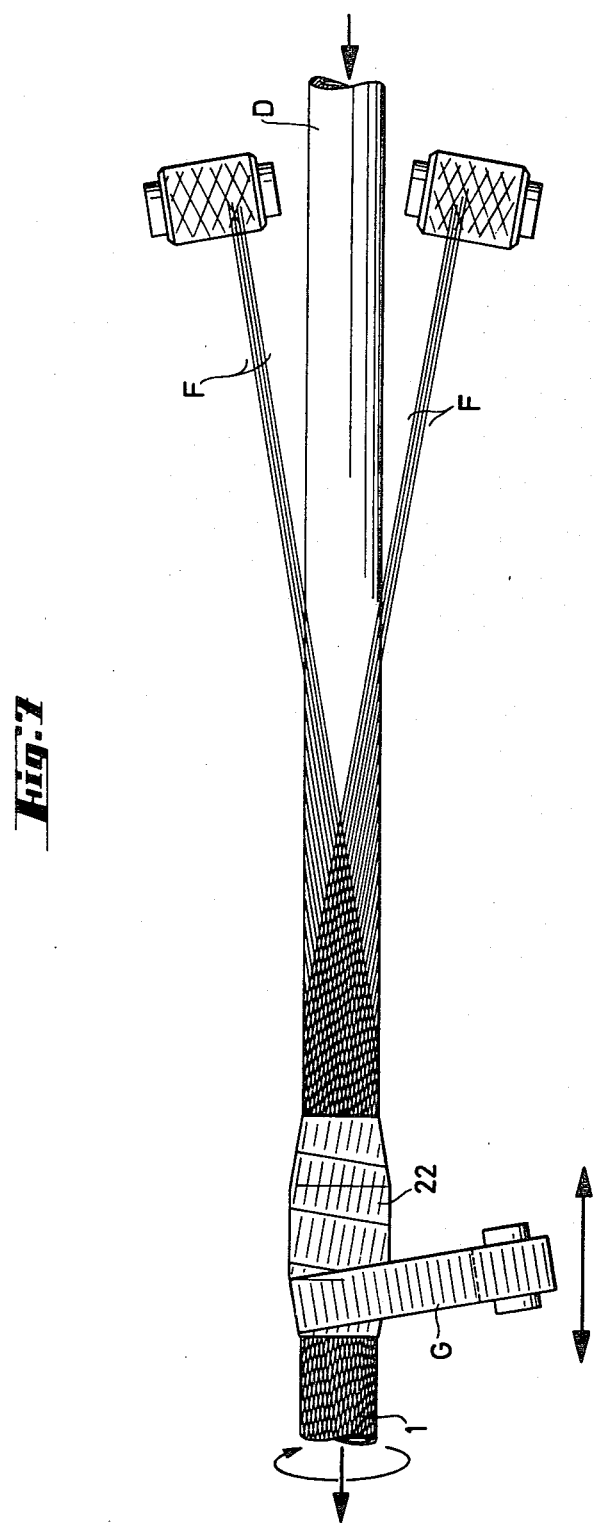

POWER TRANSMISSION SHAFT

The present invention relates to a power transmission shaft comprising a plastics tube reinforced by fibres of high stiffness, especially carbon fibres, said tube having fittings secured to its two ends for the introduction of a torque.

Recently, numerous attempts have been made to replace the steel power transmission shafts (cardan shafts) ordinarily used up to now in motor vehicle production by shafts made of carbon fibre reinforced plastics material. Some of the principal difficulties, however, that have hitherto stood in the way of these efforts, namely the suppression of undesirable vibrations at high revolutions and the limited suitability of so-called pitch fibres because of their relatively low tensile strength and shear strength, although these fibres are at present the only suitable ones on cost grounds, have been overcome by the special choice of fibre structure disclosed in European Publication No. 009,007, published Mar. 19, 1980. The introduction of torque into the material which is highly anisotropic on account of the chosen fibre structure is, however, very problematical, at least for exacting requirements.

The previously known power transmission shafts made of carbon fibre reinforced plastics material, some of which have also been described in U.S. Pat. Nos. 4,041,599 or 4,089,190, have the fittings cemented into the ends of the plastic tube or integrated by means of longish sockets into the ends of the tube during the manufacture of this latter. In both cases the torque transmission is via a cemented joint—a feature which has proved inadequate, especially at high torques. In addition, it is difficult in actual practice to wind the fittings into the tube with the very small winding angles (about ±10°-20° to the tube axis) required by European Publication No. 009,007 cited above. All these problems, as well as the high fibre costs, have contributed to the fact that propeller shafts made of fibre reinforced plastics material have up to now been unsuccessful.

Accordingly, it is the object of the present invention to improve a power transmission shaft of the kind defined at the outset, especially in respect of the torque introduction. This object is attained by the measures recited in claim 1.

BRIEF DESCRIPTION OF THE DRAWINGS

A preferred embodiment of the invention is explained in detail hereinafter with reference to the accompanying drawings, wherein:

FIGS. 4 to 7 are diagrams to explain the production of the tube wall reinforcements.

DETAILED DESCRIPTION OF A PREFERRED EMBODIMENT

Figure 1:
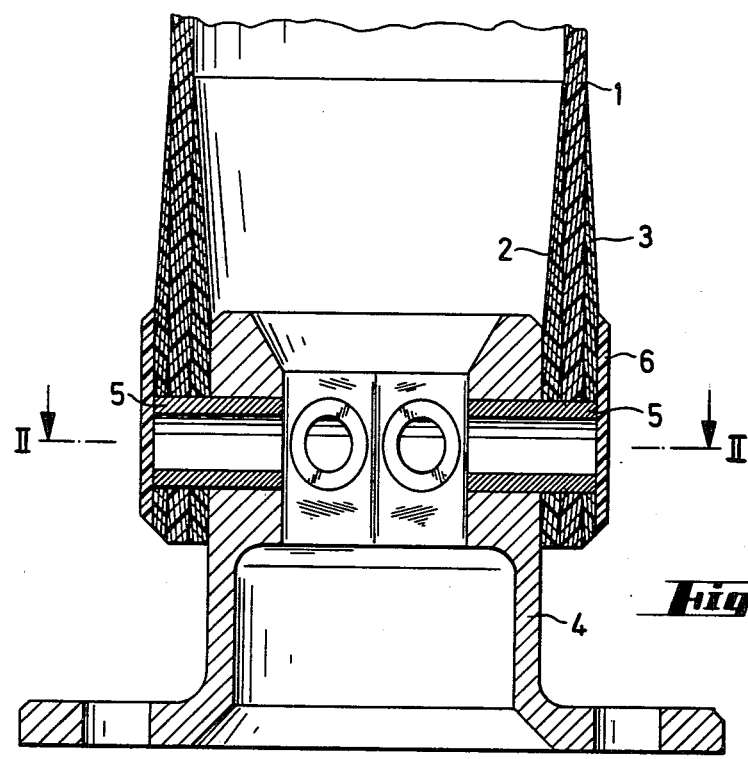
FIG. 1 is an axial section through one end of a shaft produced by a process according to the invention.
Figure 2:
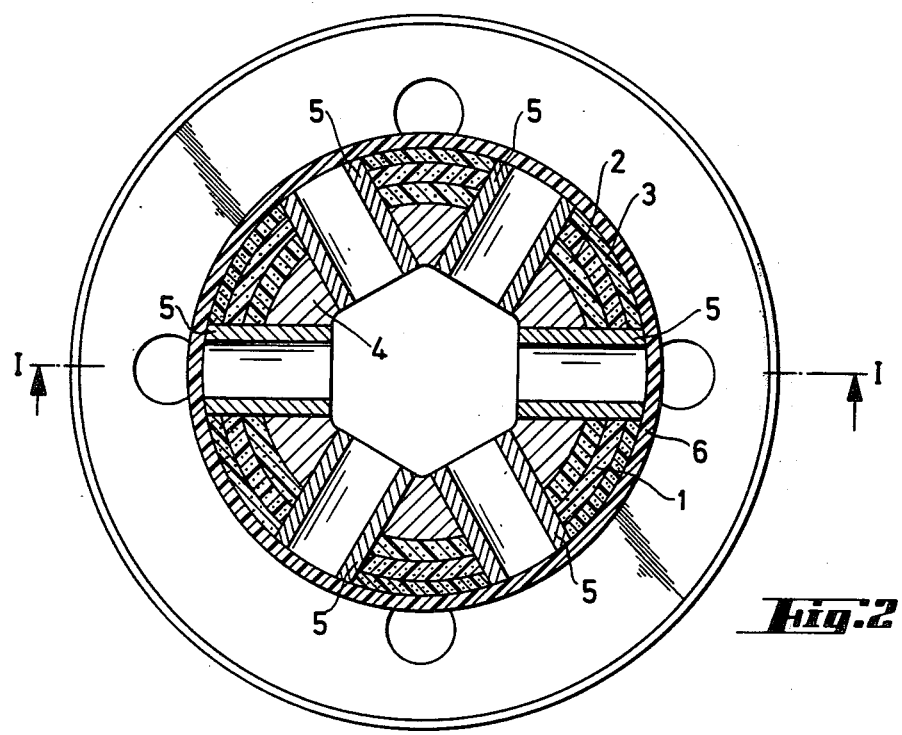
FIG. 2 is a cross-section through the shaft on the line II—II in FIG. 1.

The shaft illustrated in FIGS. 1 and 2 comprises a plastics tube 1 which is reinforced by means of carbon fibres and which is reinforced at each end (only one end is shown in FIG. 1) by a cemented-in sleeve 2 and a cemented-on tubular portion 3. A metal fitting 4 is pushed into the inner reinforcing sleeve 2. The torque is transmitted from the metal fitting 4 to the shaft by radial bolts 5. The latter are secured by a sleeve 6 cemented onto the outer reinforcing sleeve 3.

Figure 3:
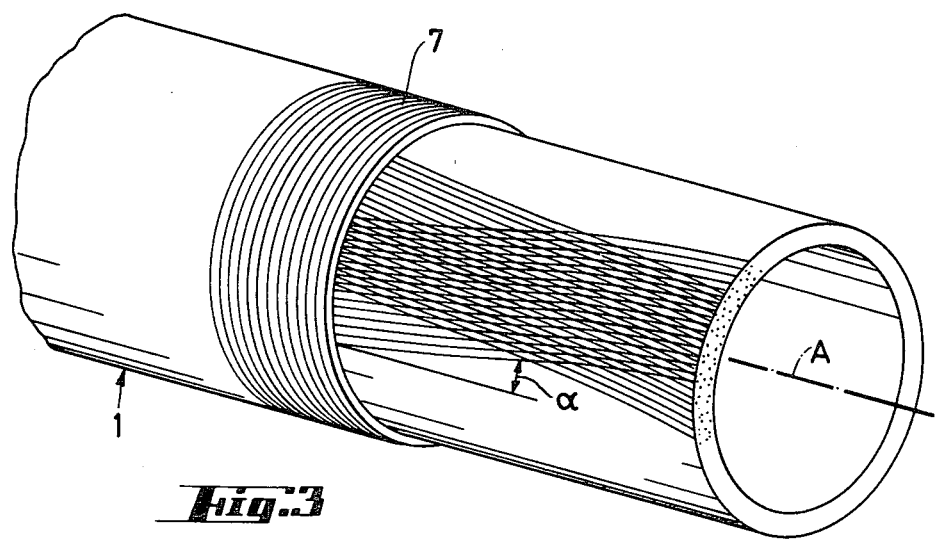
FIG. 3 is a diagrammatic detail of the shaft showing the tube winding structure.

The fibre-reinforced plastics tube may be produced by winding methods described, for example, in U.S. Pat. Nos. 2,723,705, 3,068,134, 3,202,560, 3,216,876, 3,700,519, and 4,089,190. As shown diagrammatically in FIGS. 5 to 7, carbon reinforcing fibres F impregnated with a curable plastics are wound from two reels onto a core D at predetermined winding angles $\alpha$ so that the fibres from one reel cross the fibres from the other reel to form a winding pattern as shown in FIGS. 3 and 7. If fibres from one reel are wound on the core at an angle of $+\alpha$ and the fibres of the other reel wound on the core at an angle of $-\alpha$, then one set of fibres will cross the other set at an angle of $2\alpha$. The whole is then cured by heat.

The carbon reinforcing fibres used are preferably those marketed under the name "Thornel Type P" by the Union Carbide Corporation, of 270 Park Avenue, New York, N.Y. 10017, i.e. pitch fibres. It will be understood that other fibres having comparable properties, for example those marketed under the name PRD-49 by Dupont de Nemours, Wilmington, Del. (USA), can be used too.

The inclination or winding angle of the fibres to the tube axis varies according to the intended application. The winding angle $\alpha$ (FIG. 3) with respect to the tube axis A is about ±25° to ±30° maximum, but preferably ±20° maximum or less. Although a smaller winding angle than 10° increases the modulus of elasticity of the tube in the longitudinal direction, it also reduces the torsional stiffness to values which are inadmissibly low for use as a propeller shaft. Winding angles of ±11° to ±17° have proved advantageous in practice, more particularly angles in a range of from ±12° to ±14°. These winding angles give both sufficiently high torsional stiffness and sufficiently high longitudinal flexural stiffness. It is evident that there could be provided also several layers of reinforcing fibres each being oriented at a different winding angle within the given limits.

The fibre content of the plastics tube is about 50 to 70, preferably about 60 to 70 vol%. To obtain this relatively high fibre content, and in accordance with this invention the outside of the tube is provided with a peripheral winding 7 (FIG. 3) comprising a lightweight material with a low modulus of elasticity, which is relatively resilient in comparison with the carbon fibres, and which has a high coefficient of thermal expansion, this operation being carried out during production, i.e. while the laminating resin is still flowable. Polyesters for example (e.g. Diolen (R.T.M.), modulus of elasticity about 3000 N/nm$^2$) or polyamide (+B Nylon (R.T.M) tear strip (Interglas quality 7849) is suitable material (fibres, strips or fabrics). The coefficient of thermal expansion of this light weight material should be higher than the corresponding coefficient of the reinforcing fibre-resin-compound in the circumferential direction, e.g. approx. 25–30·10$^{-6}$/oK. and more. The peripheral winding is applied with maximum tension (tractive force about 200–500 N). However, the tractive force should not of course have values such as to damage the material. The peripheral winding presses the surplus laminating resin out of the fibre structure but, because of its high coefficient of thermal expansion and its resilience, does not produce any appreciable interlaminar stresses on cooling after curing and cooling of the tube.

Low-viscosity curable epoxy resins, for example the resin marketed by GIBA-GEIGY AG, of Basle, Switzerland, under the name "Araldit CY 209" with the curing agent HT 972, or other resin and curing agent combinations giving the required thermal and mechanical strength, may be used as the plastics for the production of the tube.

The tube 1, the reinforcing fibres of which are themselves highly anisotropic and, in addition, are oriented at a small angle to the tube axis, have an extremely anisotropic behaviour, which is manifested particularly by very different strength, modulus of elasticity values, and coefficients of thermal expansion in the longitudinal and peripheral directions.

Owing to this extreme anisotropy of the multi-laminate tube structure, it is very important that the reinforcing sleeves 2 and 3, sandwiching the end of the tube 1 and which are subject to high transmission torque, should be of the same material as, or similar material to, the tube and have the same or at least substantially the same anisotropy behaviour as the tube 1. If this is not the case, considerable stresses occur between the reinforcing sleeves and the tube ends on temperature fluctuations, which could result in rupture in the extreme case.

It is also important that the reinforced zones of the tube should not terminate abruptly, but that the thickening of the tube wall at the tube ends should gradually diminish down to the wall thickness of the tube 1. For this purpose, the reinforcing sleeves 2, 3 are mechanically machined so that they taper conically towards the tube centre. This smooth continuous transition from the reinforced tube end to the non-reinforced wall zone of the tube avoids any stress peaks.

Figure 4:
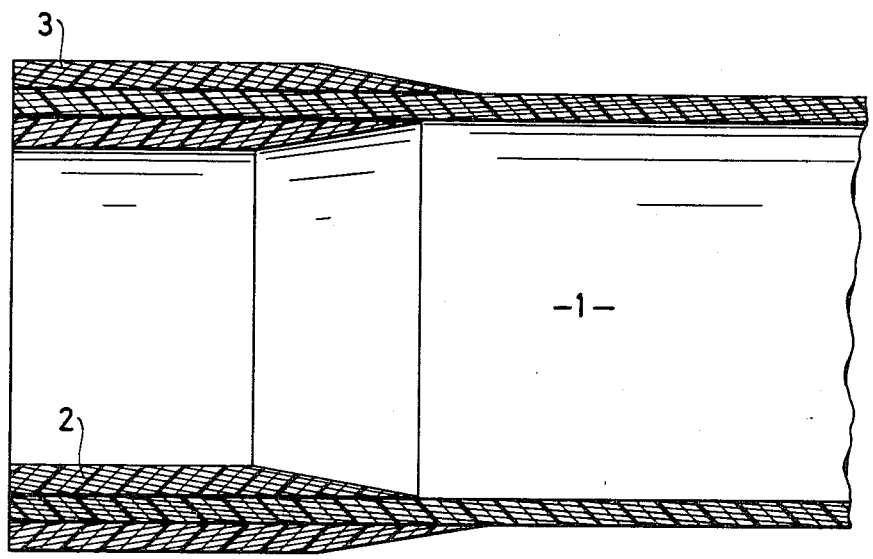

In FIGS. 1, 2 and 4 the wall reinforcements of the tube ends are formed by prefabricated reinforcing sleeves which are cemented on or into the tube. The reinforcements may, however, be produced in some other way although this is not such a simple matter in terms of winding technique, because of the very small winding angles that need to be used.

For example, referring to FIG. 5, prefabricated and appropriately shaped reinforcing sleeves 12 disposed with a spacing corresponding to the intended tube length on the mandrel D used for producing the tube may be incorporated into the tube structure by covering them with the carbon fibres F.

Referring to FIG. 6, the prefabricated reinforcing sleeves 12 may be replaced by a local winding 22 on the mandrel, said winding consisting of a unidirectional fibre fabric G. The fibres of the fabric are so aligned as to occupy the same positions in the winding as do the fibres of the tube, thus giving the same anisotropy behaviour.

Instead of directly incorporating the wall reinforcements in the tube fibre structure (FIGS. 5 and 6), the coil 22 of unidirectional fabric G may, as shown in FIG. 7, be applied to the completed tube 1 subsequently.

For continuous tube production of the kind which has long been conventional in the case of glass fibre reinforced plastics tubes, the most advantageous procedure would appear to be to wind over the prefabricated sleeves as shown in FIG. 5.

In the case of tubes produced in accordance with FIGS. 5 to 7, the tube ends are simply thickened towards the exterior. This is immaterial however provided that the wall thickness thus obtained is sufficient to take the stresses produced by the applied torque when in use.

A plastics cardan shaft constructed with a winding angle of ±12° to the axis and a pitch fibre content of 70% of the total material volume, had a critical speed of more than 8100 rpm and a torsional stiffness such that the required maximum shaft twist angle of 12° was not exceeded at maximum torque (1500 Nm).

We claim:

1. A power transmission shaft, comprising a plastics tube reinforced by fibres of high stiffness, fittings secured to its two ends and at each end of the tube a wall reinforcement of fibre reinforced plastics tapering towards the middle of the tube, the wall reinforcment fibre structure being similar to that of the tube so that the tube and the wall reinforcements have at least approximately the same anisotropic behaviour, and radial bolts located in the region of the wall reinforcements securing said fittings to said tube.

2. A shaft according to claim 1, including a sleeve fixed to each end of the tube securing said radial bolts.

3. A shaft according to claim 1, wherein the tube ends are reinforced only on the outside of the tube.

4. A shaft according to claim 1, wherein the tube ends are reinforced both on the outside of the tube and on the inside of the tube.

5. A shaft according to claim 1, wherein the wall reinforcements are integral with the tube.

6. A shaft according to claim 1, wherein the wall reinforcements are tubular portions wound into the tube structure.

7. A shaft according to claim 1, wherein the wall reinforcements comprise local additional windings of a unidirectional fibre fabric.

8. A shaft according to claim 7, wherein the additional windings are disposed above the tube fibres.

9. A shaft according to claim 7, wherein at least some of the tube fibres are disposed above the additional windings.

10. A shaft according to claim 1, wherein the wall reinforcements are tubular portions cemented to the tube.

11. A shaft according to claim 1, wherein substantially all reinforcing fibres are oriented at an angle from ±10° to ±25° to the tube axis.

12. A shaft according to claim 11, wherein the reinforcing fibres are oriented at an angle from ±10° to ±20° to the tube axis.

13. A shaft according to claim 11, wherein the content of reinforcing fibres is in the range 50–70 vol%.

14. A shaft according to claim 1, further comprising peripheral winding of material which is relatively resilient with respect to the reinforcing fibres and which has a high coefficient of thermal expansion wound over said reinforcing fibres and oriented at an angle in the range from ±80° to ±90° to the tube axis.

15. A shaft according to claim 14, wherein the coefficient of thermal expansion of said peripheral winding material is greater than the corresponding coefficient of the reinforcing fibres-resin-compound in circumferential direction.

* * * * *